(12) United States Patent
Bell

(10) Patent No.: US 10,974,171 B2
(45) Date of Patent: *Apr. 13, 2021

(54) COMPACT, INFLATABLE, SNORKEL-FLOAT APPARATUS AND METHOD

(71) Applicant: THOUGHT PRESERVE, LLC, Fallbrook, CA (US)

(72) Inventor: David A. Bell, Farmington, UT (US)

(73) Assignee: THOUGHT PRESERVE, LLC, Fallbrook, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,655

(22) Filed: Nov. 5, 2019

(65) Prior Publication Data

US 2020/0061497 A1 Feb. 27, 2020

Related U.S. Application Data

(60) Continuation of application No. 16/217,294, filed on Dec. 12, 2018, which is a division of application No. 15/234,216, filed on Aug. 11, 2016, now Pat. No. 10,159,914.

(Continued)

(51) Int. Cl.
*B01D 17/02* (2006.01)
*B01D 21/00* (2006.01)
(Continued)

(52) U.S. Cl.
CPC ..... *B01D 17/0214* (2013.01); *B01D 21/0024* (2013.01); *B01D 21/2444* (2013.01);
(Continued)

(58) Field of Classification Search
CPC ........... B01D 2221/04; C02F 2001/007; C02F 2103/10; C02F 2201/008; B63B 22/22; B63B 2022/006; B63B 22/06
See application file for complete search history.

(56) References Cited

U.S. PATENT DOCUMENTS 3,139,054 A 6/1964 Van Heusen
3,535,884 A 10/1970 Chaney
(Continued)

OTHER PUBLICATIONS

Adler Tank Rentals http://www.adlertankrentals.com/products/tanks/closed-top/21000-gal-frac, Sep. 29, 2016.
(Continued)

*Primary Examiner* — Ana M Fortuna
(74) *Attorney, Agent, or Firm* — Pate Baird, PLLC

(57) ABSTRACT

A tank system may be conventional and fixed, or mobile, such as a fracking fluid or other tank trailer. A drain port thereof is fitted with an adapter connecting a snorkel system to drain liquids from near the top of the liquid level in the tank. A snorkel head at the extreme distal end of a tube near the longitudinal center of the tank is suspended by a system of buoys. A flow field controller resists formation of vortices near the snorkel head, so it can operate as near the surface as possible, withdrawing the highest grade oil efficiently without entrainment of overlying gases and vapors, nor the second liquid layered therebelow. All are configured to fit into the tank without requiring any personnel to enter the tank. Oil, water, and sludge may drain through the system to exit the tank.

19 Claims, 15 Drawing Sheets

Related U.S. Application Data

(60) Provisional application No. 62/208,945, filed on Aug. 24, 2015, provisional application No. 62/259,856, filed on Nov. 25, 2015.

(51) Int. Cl.
*B01D 21/24* (2006.01)
*B01D 21/30* (2006.01)
*C02F 1/00* (2006.01)
*C02F 103/10* (2006.01)

(52) U.S. Cl.
CPC ...... *B01D 21/307* (2013.01); *C02F 2001/007* (2013.01); *C02F 2103/10* (2013.01); *C02F 2201/008* (2013.01)

(56) References Cited

U.S. PATENT DOCUMENTS

| | | | |
|---|---|---|---|
| 3,745,773 | A | 7/1973 | Cunningham |
| 4,396,504 | A | 8/1983 | Tannehill |
| 4,534,969 | A | 8/1985 | Phillips |
| 9,410,416 | B2 * | 8/2016 | McKenzie ............. E21B 43/36 |
| 9,240,550 | B2 | 9/2016 | Dellmann et al. |
| 10,159,914 | B2 * | 12/2018 | Bell ................... B01D 21/2444 |
| 2004/0200399 | A1 | 10/2004 | Abdel-Maksoud et al. |
| 2015/0246726 | A1 * | 9/2015 | Pongratz ............... B64C 27/001 244/17.21 |
| 2017/0056787 | A1 | 3/2017 | Bell et al. |
| 2018/0086402 | A1 | 3/2018 | Hindle |
| 2019/0329844 | A1 * | 10/2019 | Adams ................... B63B 22/02 |
| 2019/0375482 | A1 * | 12/2019 | Hansen .................. B63B 22/08 |

OTHER PUBLICATIONS

E-tank http://www.etank.net/products/Tanks/10000-gallon-mini-frac-tank, Sep. 29, 2016.
Affordable Tank Rentals http://affordabletankrentals.com/frac-tank-rentals/, Sep. 29, 2016.
Exa Frac Tanks http://www.drillingbarite.com/exa_frac_tanks.htm, Sep. 29, 2016.

* cited by examiner

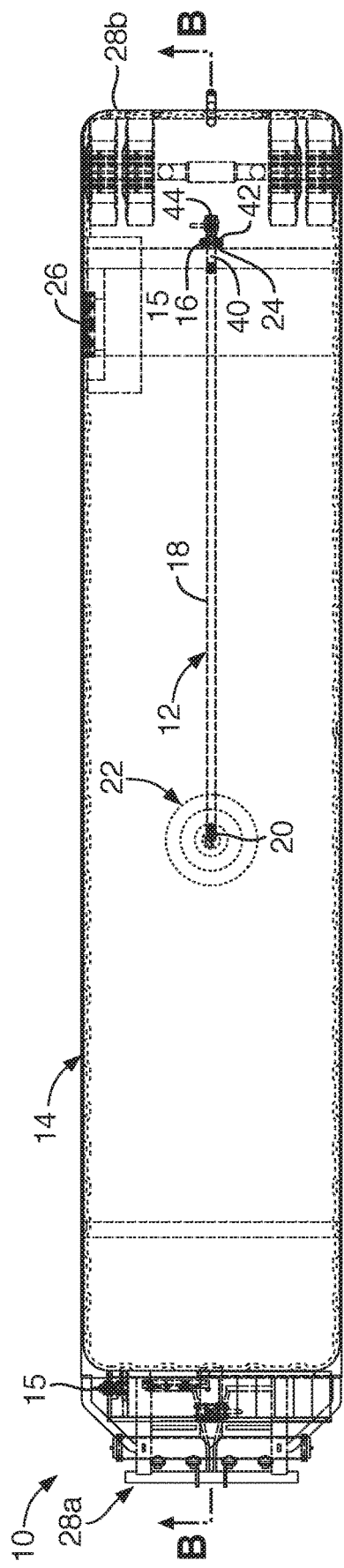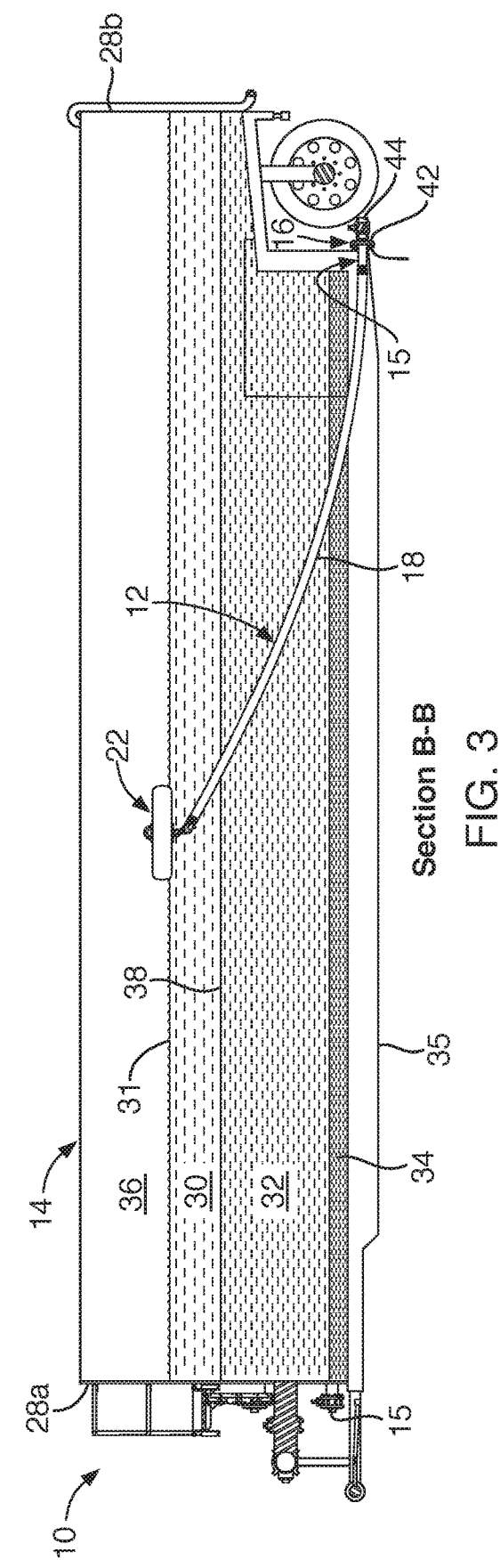
View A-A
FIG. 2
Section B-B
FIG. 3

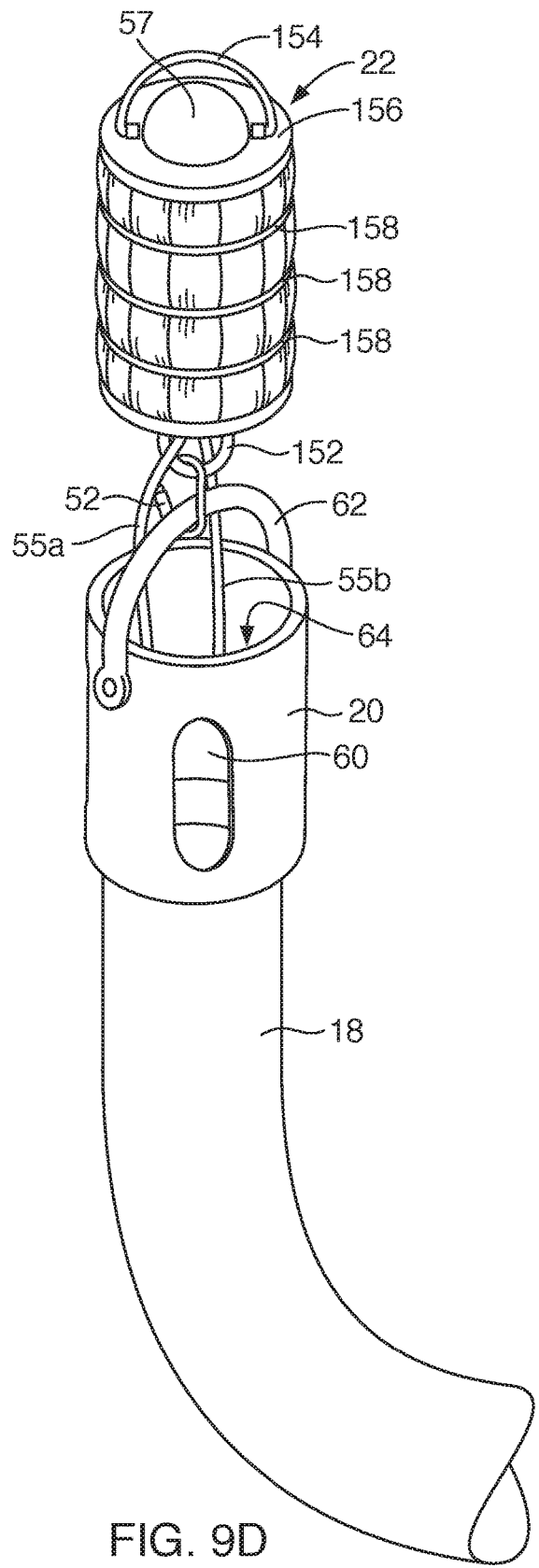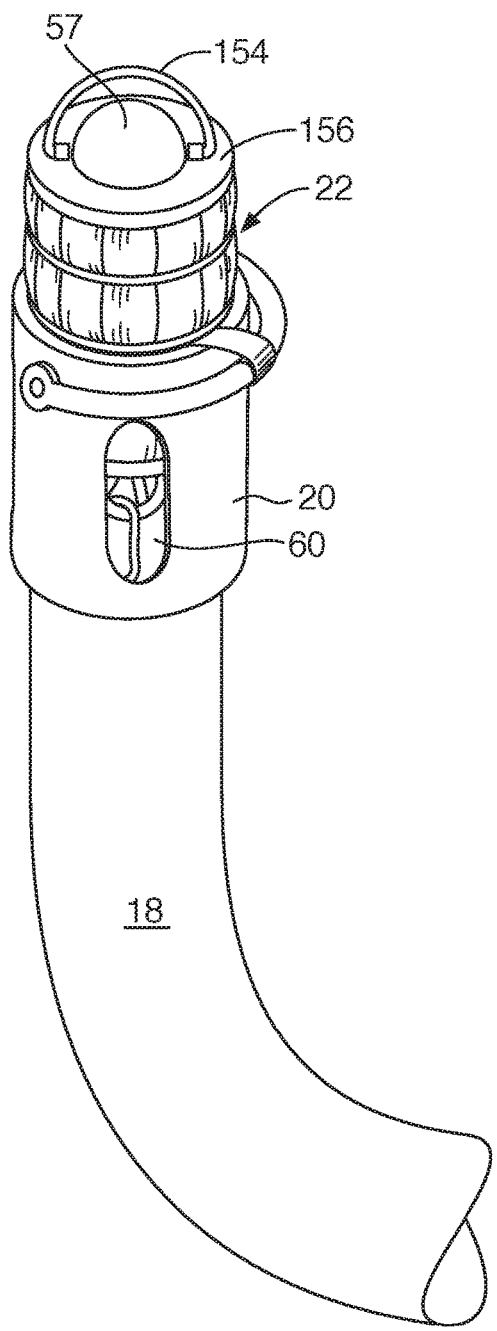
FIG. 9D
FIG. 9E

Section A-A

COMPACT, INFLATABLE, SNORKEL-FLOAT APPARATUS AND METHOD

RELATED APPLICATIONS

This application: is a continuation-in-part of U.S. patent application Ser. No. 16/217,294, filed Dec. 12, 2018; which is a divisional of U.S. patent application Ser. No. 15/234,216, filed Aug. 11, 2016; which claims the benefit of U.S. Provisional Patent Application Ser. No. 62/208,945, filed Aug. 24, 2015 and U.S. Provisional Patent Application Ser. No. 62/259,856, filed Nov. 25, 2015. All of which are hereby incorporated herein by reference in their entirety.

BACKGROUND

Field of the Invention

This invention relates to petroleum production and, more particularly, to novel systems and methods for separation of oil from production brine and sediments.

Background Art

Petroleum production will typically produce some quantity of petroleum, also referred to as crude, or crude oil. It will typically also produce a certain amount of water, typically constituted as brine containing salts and various other minerals. Natural gas (methane) and various trace gases will often result, as well as certain quantities of basic sediments, including precipitates, sand, rock chips, other solids, and so forth.

One need is an ability to empty a settling tank cleanly and completely. Entrainment of content settled out below the species being extracted is particularly problematic. One desire is selectively draining an individual layer from any separator cleanly (unmixed) and efficiently. Minimizing the risk of re-mixing already separated constituents is difficult to achieve.

For example, fluid mechanics dictates that viscosity of a moving fluid entrains surrounding fluid. Withdrawing oil without entraining a nearby layer of water is a typical challenge. Draining water without entraining "bottoms" or "tank bottoms" is likewise. "Tank bottoms" are the bottommost sludge in a tank, a large fraction thereof being solids from the basic sediments and water (BS&W). Cleaning and draining tank bottoms clinging to floors and walls present their own problems, as well.

Access for inserting and assembling a snorkel head and float system as disclosed in the above-referenced patent documents through a manway is problematic, even dangerous, due to volatile organic compounds (VOCs). A safer, simpler access is needed.

BRIEF SUMMARY OF THE INVENTION

In view of the foregoing, in accordance with the invention as embodied and broadly described herein, a method and apparatus are disclosed in one embodiment of the present invention as including a compacted (e.g., deflated and packed) snorkel float deployable to lift a snorkel head system for draining a settling tank. The separation tank or tank trailer may be adapted from a fracking fluid mixing tank.

In certain embodiments, apparatus and methods in accordance with the invention include a snorkel line that traverses through a port near the tank bottom. Rising up through "tank bottoms" and water separated out below the oil, it passes through the murky interface layer or "dispersion band" between the lower water layer (brine) and the upper oil region.

A sub-size line has an outer diameter that is less than the inner diameter of the bottom port in a tank trailer. By connecting a new valve and flange to a lowest flange of a tank trailer, the tank trailer may be penetrated for connection of a snorkel. The snorkel may be connected to a line and fittings, including various adapters, and the like secured to the sealed. The flanged assembly inserted into the exit port at or near the bottom of a tank trailer may include a train" of components. Leading is a compacted float system, followed by the snorkel head, the drain line, and the adapter extending into the tank from the flange outside it.

One adapter may include a central line (tube) surrounded by an outer line (annulus). The inflow areas are about equal. Thus, the sludge, constituting "bottoms" may still be drained through the annulus, after, or even while, the snorkel drain operates. Oil taken into from near the top of the tank exits through the tube. "Bottoms" exit from the bottom of the tank through the annulus.

At the extreme top end of the tube or line will float the snorkel head or simply "head" positioned below the deployed float. The draining point is typically near the uppermost extremum of the uppermost layer in a settling (separation) tank. Thereat, the snorkel may first withdraw the highest quality, meaning the lightest density and highest purity, oil containing the fewest impurities. To maintain the snorkel head at the proper altitude, means for a levitation or buoyancy is passed through a bottom port of the tank ahead of the snorkel and line.

To resist ingestion of gases, the snorkel head at the top region of the oil layer sits under a synthetic depth 53. This is created by an obstructive panel that operates as a vertical stop and a horizontal spacer. Overlying gases are kept at a specified distance away from the inlet or inlets in the head of the snorkel system. The spacer may also be thought of as a flow field (region of fluid moving toward an outlet) controller providing two factors to avoid vortices. The first is a broader flow field from which to draw fluid. This is defined by a diameter bounding a cross section through which surrounding fluid will flow toward the drain point (head). That hemispherical cross section, as it grows, necessarily requires less velocity and less pressure differential to pass a given volumetric flow rate.

Another factor in fluid mechanics is viscosity, a property of fluids that relates to their resistance to flow. Thus, if oil is comparatively more viscous, it has a higher viscosity, meaning a higher resistance to flow.

Meanwhile, the effect of the radius or diameter of the spacer is calculated, along with actual depth to provide a synthetic (effective) depth or minimum flow path between the surface of the oil at the edge of the obstructive panel and the inlet to the snorkel. That minimum flow path provides two features. One is time. Time permits oil to back flow or fill in and force out air that may be drawn (entrained) into the flow field. Second, the minimum flow path provides an equalization of the distance fluid must travel to arrive at the snorkel. It effectively makes or reduces a sphere, otherwise filled with air in its top hemisphere, into a walled-off, lower hemisphere of liquid only. By creating a comparatively long and tortuous path between the top surface 31 and the snorkel head 20, the buoy system 22, and particularly one or more of the surfaces 50, 51 have been shown to resist vortices contributing to air ingestion and liquid layer mixing.

If the snorkel were at the actual surface, the sphere would effectively become a hemisphere, truncated at the upper end of that hemisphere by air. The viscosity of air is so slight, its mass so light, and so forth, that the snorkel will draw almost exclusively air.

Access to contents in the tank is best done by passage of the snorkel and its flotation (buoy) system through the same penetration as the adapter leading of the tank to the valves. Installation, operation, and cleaning are all dependent on that access in a system and method in accordance with the invention. Multiple passages may run concentrically through a single penetration. At least one annulus may surround a conduit interior thereto. An annulus may be divided about its circumference to provide multiple channels therein, but such complexity is not necessary.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 2 is a top plan view of the system of FIG. 1 taken at section A-A;

FIG. 3 is a side elevation view thereof taken at section B-B;

FIG. 9D is a perspective view of the float system in a compacted configuration linked to a head of a snorkel in order to be insertable into a tank in accordance with the invention;

FIG. 9E is a perspective view of one embodiment of a compacted buoy system configured to be at least partially insertable into a head of a snorkel, in accordance with the invention;

DETAILED DESCRIPTION OF THE PREFERRED EMBODIMENTS

Figure 1:
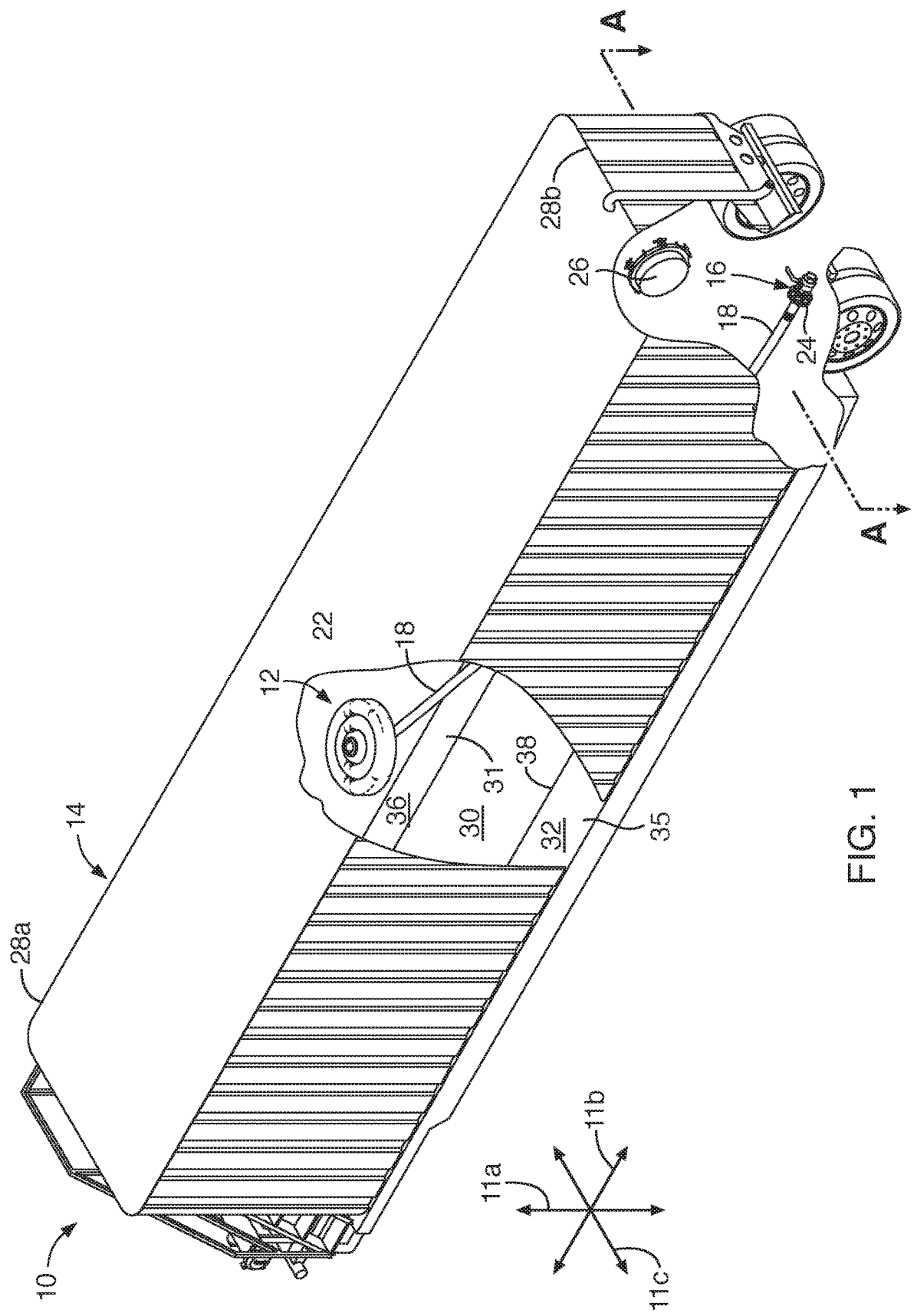
FIG. 1 is a perspective view of a partially cut away separation tank, illustrating a snorkel penetration into the tank, and its distal end system of buoys and flow field controller plate, as well as a manway by which access may be made for installation and servicing of a snorkel in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1 through 4, while referring generally to FIGS. 1 through 13, in one embodiment of an apparatus and method in accordance with the invention, a system 10 may provide significant improvements to snorkel head flotation.

Water is considered a degradation and dilution when found in oil. Refineries object to water due to volume loss and the energy cost of vaporizing it in a fractionating column. Basic sediments are likewise problematic, causing undesirable wear, damage, fouling, and so forth.

A system 10 and method in accordance with the invention define a vertical direction 11a, longitudinal direction 11b, and a lateral direction 11c, all mutually orthogonal. The directions 11 have significance, notwithstanding each is shown as having a respective axis 11a, 11b, 11c extending in opposite directions along a single line. The vertical direction 11a corresponds to gravity and gravitational forces. Thus, the direction 11a is the direction of buoyancy, separation, and settling. Meanwhile, the longitudinal direction 11b and the lateral direction 11c together effectively define a horizontal plane when a system 10 is level.

In the illustrated embodiment, a snorkel system 12 for a tank 14 passes through one of a variety of drains 15 or ports 15. Together, an adapter system 16, line 18, head 20 (for taking fluid out of the tank 14), and the supporting buoy system 22 constitute the snorkel system 12 of the overall settling tank separator system 10. That adapter system 16 secures sealingly to the drain 15 or port 15 in order to pass therethrough and connects to a line 18 inside the tank 14 leading upward to a head 20 near the top liquid surface 31. The head 20 is supported by a buoy system 22.

The adapter may have a pipe 40 or fitting 40 inside an annulus. The pipe 40 connects to the line, while the annulus is exposed to the open tank, near the floor. Outside the flange 42, the annulus 100 and pipe 40 separate to a "bottoms" line and a "saleable oil output" line.

A flanged penetration 24 defining a drain 15 or port 15 provides access for the adapter system 16. Typically, manways 26 may be located on the top (roof) or a side wall near the top or bottom thereof, even in the end bulkhead. However, personnel in a tank 14 that has been closed after containing any significant amount of petroleum may be asphyxiated.

Similarly, the head 20 and buoy system 22 may be configured to compact in order to fit through the port 15 or the flanged penetration 24. In one currently contemplated embodiment, the adapter system 16, line 18, head 20, and a compacted buoy system 22 may be preassembled outside of the tank 14. One reason for installing the line 18 to the head 20 before introduction into the tank 14 is that the line 18 may then simply be secured onto the adapter system 16, the head 20 to the line 18, the compacted buoy system 22 to the head 20 not requiring exposure of any humans to dangerous gases inside the tank 14.

If orientation of the head 20 is important, then twisting or rotating of the line 18 is a simple matter prior to being secured to the adapter system 16. Meanwhile, the head 20 may be oriented and secured by inserting the head 20 into the line 18 before the line 18 is installed in the tank 14. Manipulating the line 18 to orient the head 20, after the line 18 and head 20 are secured to one another does not present a large, let alone insurmountable, challenge.

Referring to FIGS. 1 through 4, while continuing to refer generally to FIGS. 1 through 13, a tank 14 after introduction of production fluids may separate those production fluids into different layers 30, 32, 34. Typically, the top layer 30 (below overlying gases 36) is an oil layer 30 represented by a top surface 31. The oil layer 30 may actually be somewhat stratified from its top surface 31 down toward the water layer 32. Dissolved solids, salts, and the like, as well as other trace minerals or chemicals, may also exist in the water 32.

Above the oil layer 30 is a gas region 36 or air region 36 including air, volatile organic compounds (VOC), some amount of evaporated moisture, and so forth.

Meanwhile, the tank "bottoms" 34 represent crud 34 or a combination of basic sediments mixed with some quantity of hydrocarbons, water, and so forth near the floor 35 of the tank 14, the dregs 34 of the tank 14.

The interface 38 between the oil layer 30 and the water layer 32 constitutes a dispersion band 38. As water separates out of oil and oil separates out of water, each travels in a direction opposite the other toward the water layer 32 and oil layer 30, respectively. Water travels downward through the oil layer 30 toward the water layer 32. Sediments travel downward from the oil layer 30 and the water layer 32 to arrive at the bottoms 34.

Referring to FIGS. 4 through 8, while continuing to refer generally to FIGS. 1 through 13, a system 10 in accordance with the invention may rely on the snorkel system 12 secured to the tank 14. It passes through a flange penetration 24 into which is fitted a fitting 40 or adapter 40. A flange 42 may be formed as a part thereof, or as an assembly therewith.

The fitting 40 or adapter 40 and all other components destined to reside in the tank 14 should best fit inside the flange penetration 24. All need an outer diameter less than the inner diameter of the flange penetration 24. The valve 44 may replace any other valving that would otherwise or previously be secured to the tank 14 at the flange penetration 24.

In certain embodiments, the entire fitting 40 or adapter 40 may be passed through a ball valve. Nevertheless, it has been found convenient to secure the flange 42 directly to the flange penetration 24, thereby securing the entire adapter system 16 at the port 15 of the tank 14. The fitting 40 at the proximal (outside tank 14) end of the line 18 and the head 20 at the distal (inside tank 14) end thereof may be secured by compression bands 48 securing the line 18 against barbs 66.

The buoy system 22, linked to the head 20, stably maintains the orientation of the head 20. It may include a divider 50 engineered to provide an "effective vortex depth" for the head 20. For example, the layer 50 or divider 50 (whether a plate 50, membrane 50, or otherwise) may sit below the top surface 31 of the oil layer 30. Links 52 connect it to a single buoy 54 or multiple buoys 54. Buoys 54 may ride partially submerged, due to their own weight, the weight of the divider 50, supported head 20, and line 18.

Figure 4:
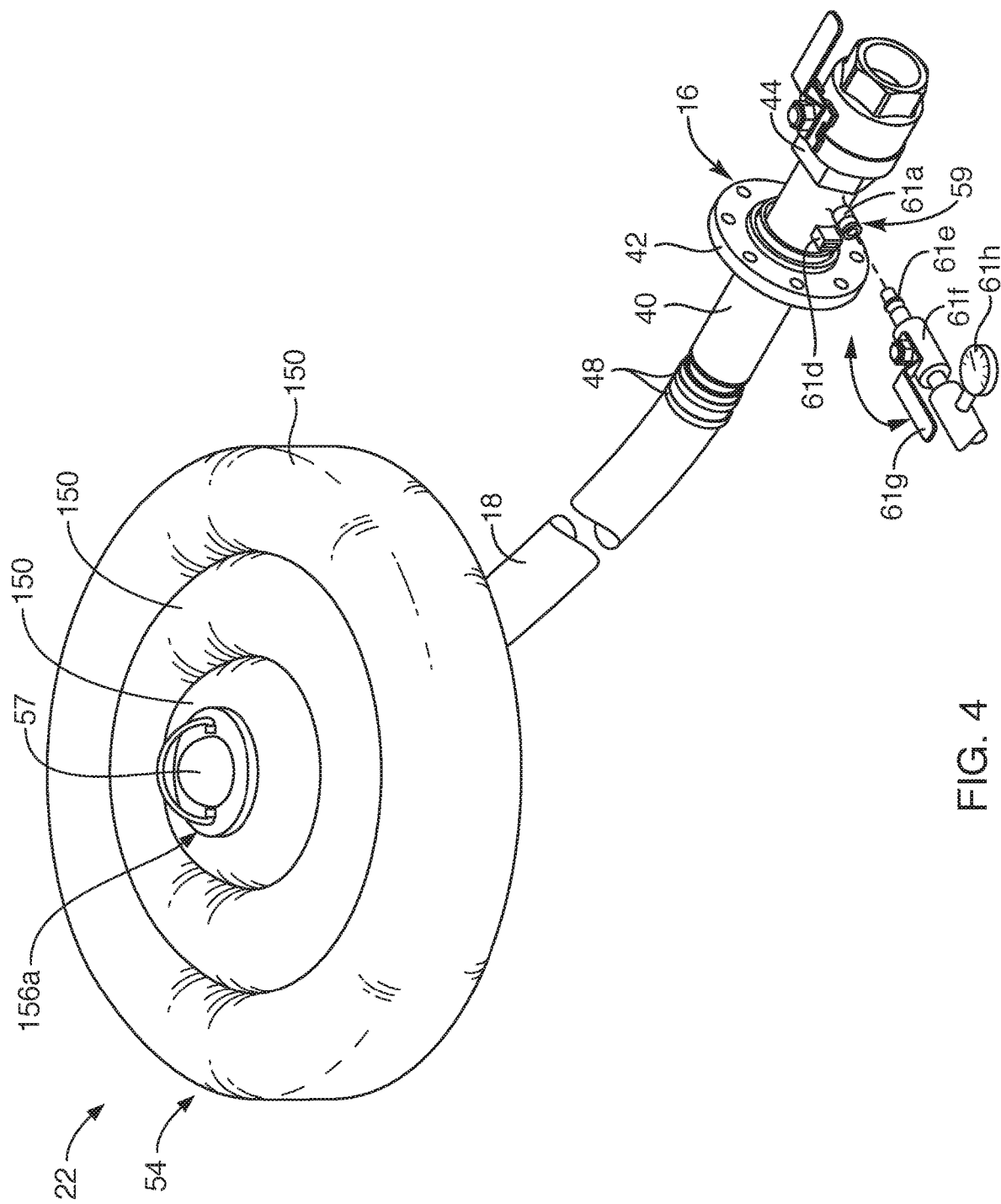
FIG. 4 is a perspective view of one embodiment of a snorkel system in accordance with the invention with an inflation port.
Figure 5:
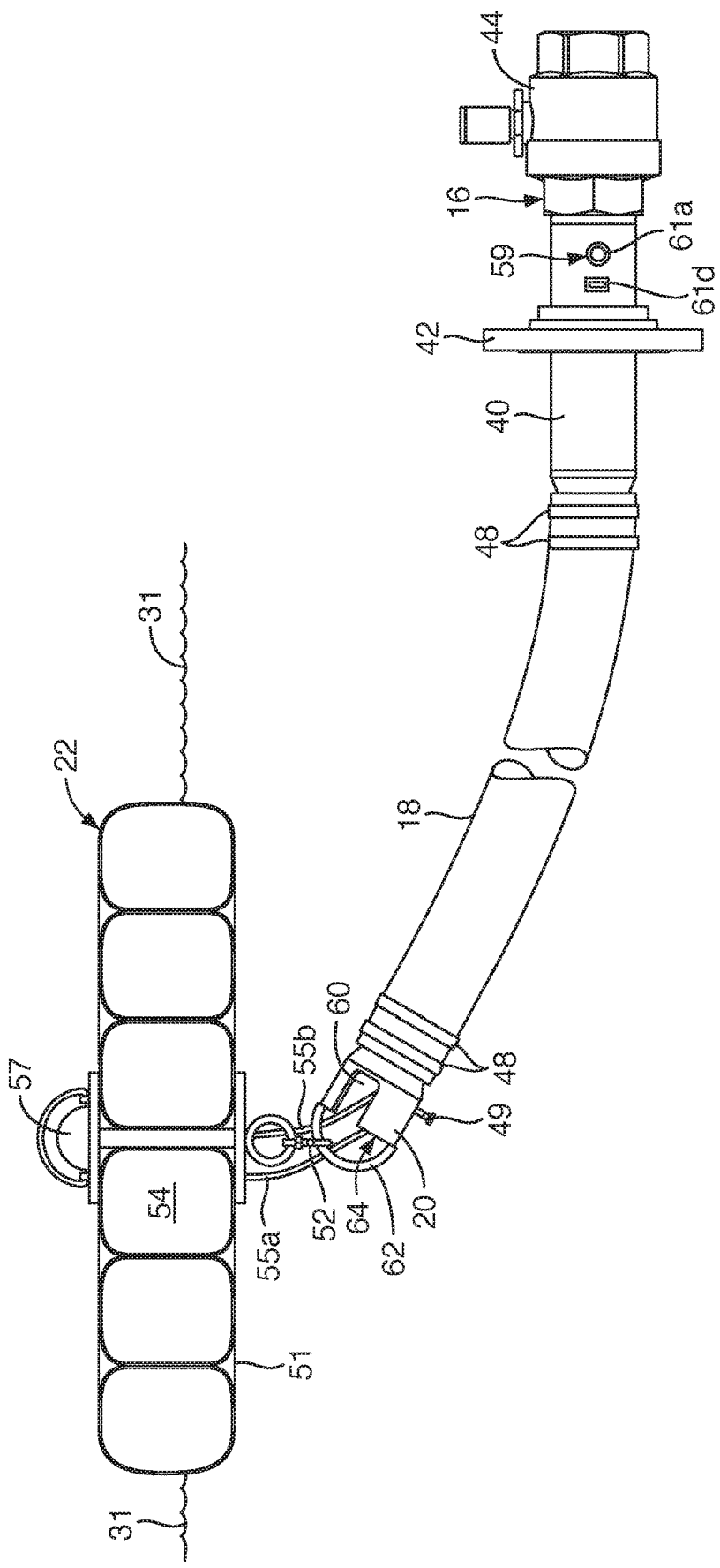
FIG. 5 is a side elevation view thereof.

For example, referring to FIGS. 4 and 5, the buoys 54 provide a density difference displacing the oil layer 30. Buoyancy lifts or floats the divider 50 as a synthetic depth 53 device 50 and the apertures 60 or ports 60 in the head 20 feeding the channel 64 supported by the connector 62 or bail 62.

One should also understand that a vortex is a swirling flow. It has multiple embodiments. A vortex may simply be an area of swirling liquid. In this embodiment, the liquid flow is sufficient to assure that gases are not entrained in the vortex. In other embodiments, a vortex may create a gas region due to centripetal forces in the liquid casting liquid outward, thereby reducing the altitude of the upper surface 68 or liquid level 68, yet not entraining any gas that descends to enter the snorkel. Finally, a vortex may actually bring gases down to the level of an access port in the snorkel head 20. The first two embodiments do not actually introduce gases into the exit flow. The third embodiment does. All three embodiments "stir" the liquid, causing mixing. Mixing affects various levels and will mix lower layers into upper layers as the upper layers thin with draining. Thus, vortices should be avoided in all their embodiments, since they reverse the separation done previously by the settling tank 14.

Figure 6:
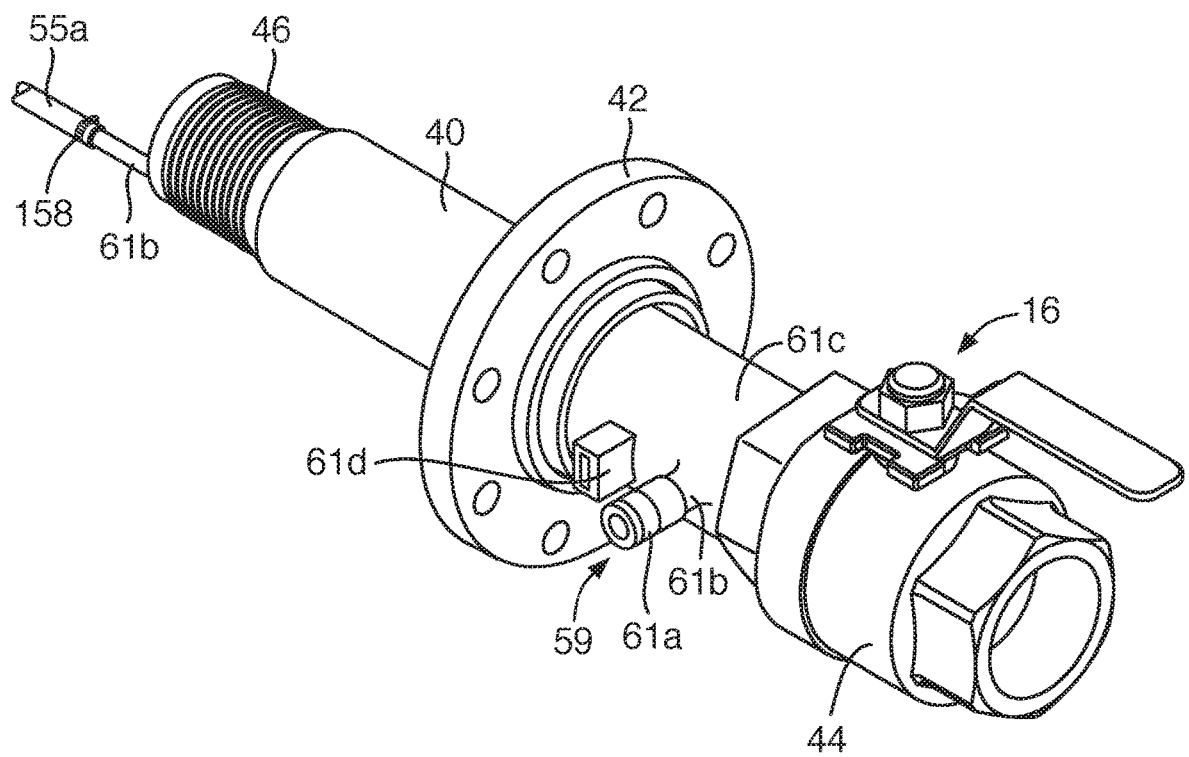
FIG. 6 is a perspective view of the details of one embodiment of a flange and adapter, inflation port, along with the controlling ball valve positioned at the entry point into the tank trailer or separation tank in accordance with the invention.
Figure 7:
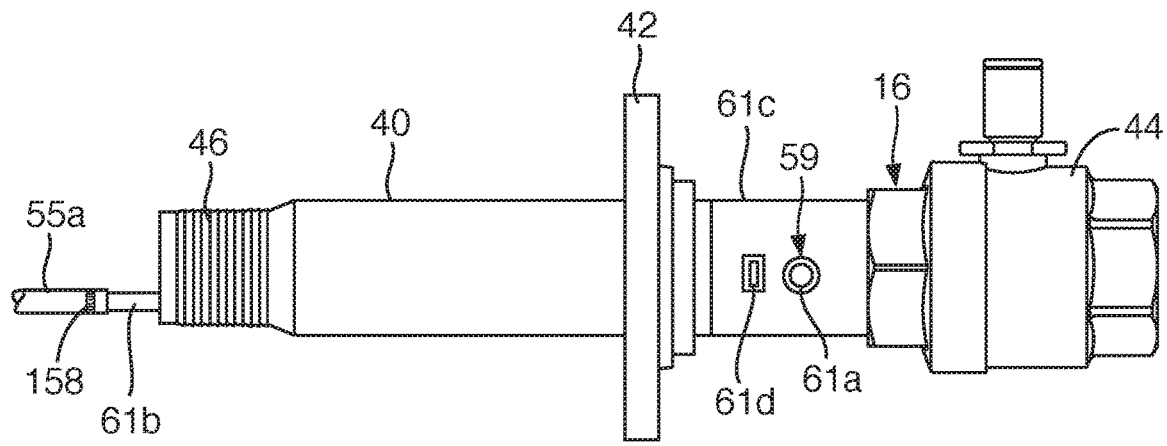
FIG. 7 is a partially cut-away, left side elevation view thereof.

Referring to FIGS. 5 through 7, while continuing to refer generally to FIGS. 1 through 13, the actual depth 69 (below the liquid level 68) of the centroid or effective center of the head 20 or the apertures 60 of the head 20 is a physical dimension. It may be calculated, measured, and generally known by calculating a hydraulic diameter. Suffice it to say the radius 70 of the divider 50 or synthetic depth 53 device 50 is determined according to an effective distance equivalent to a required depth.

Figure 8:
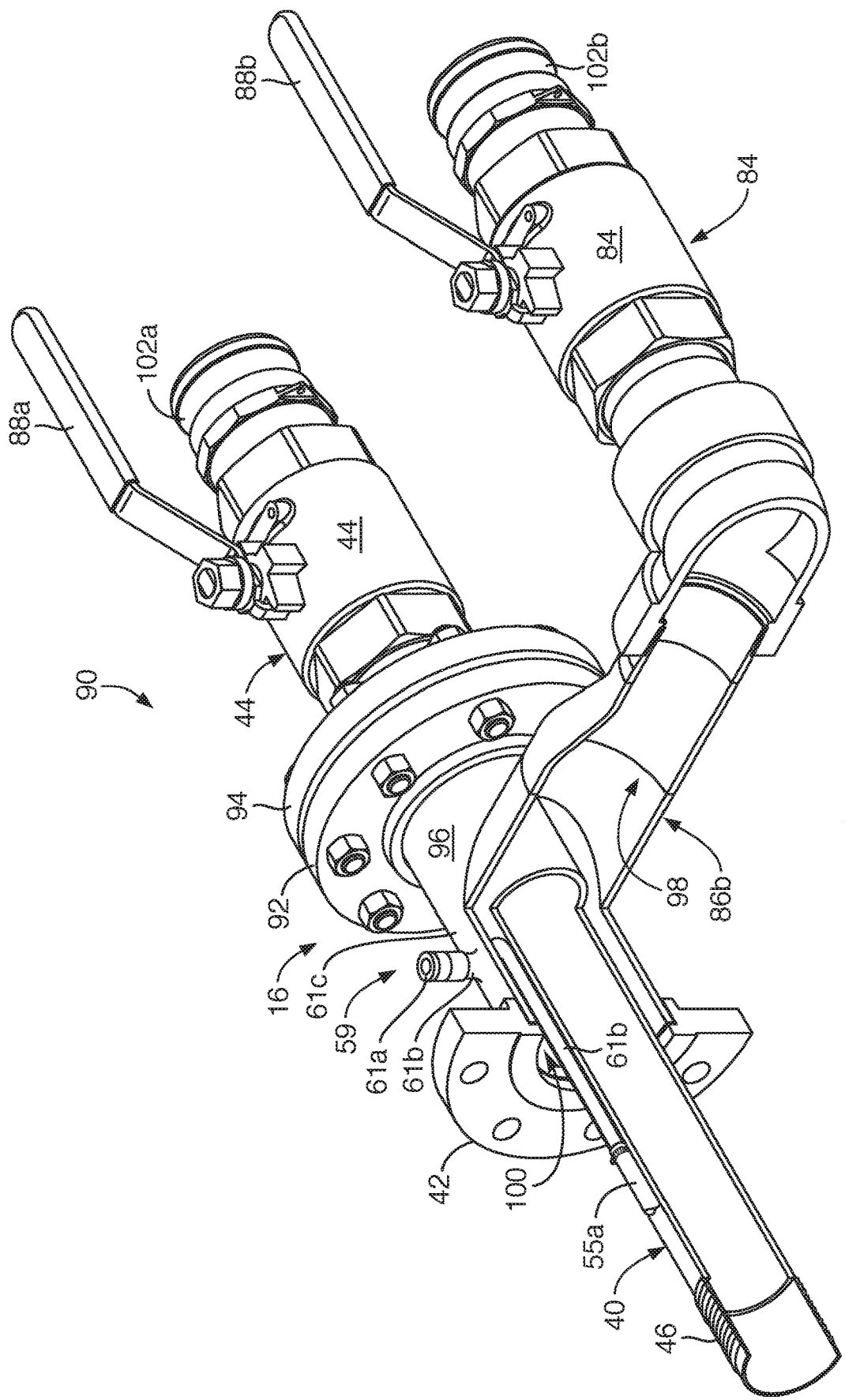
FIG. 8 is a partially cut away, perspective view of one alternative embodiment of pneumatic access through an adapter providing an inner conduit and an outer, annular conduit for receiving two flows from different locations, one through a snorkel from near the top of a tank, and one from the bottom of the same tank.
Figure 9A:
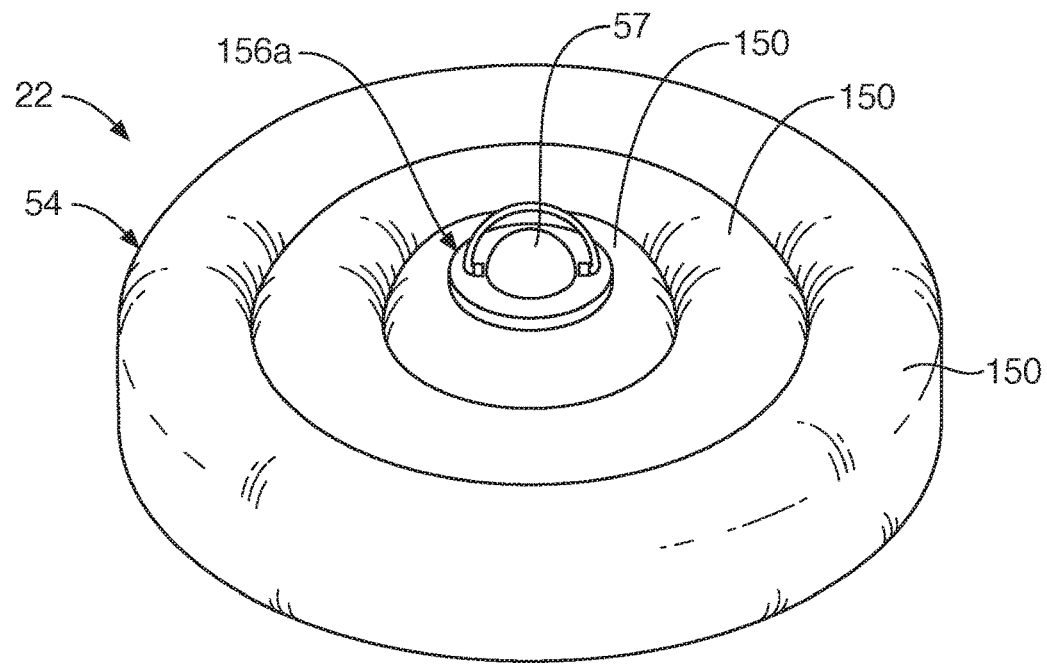
FIG. 9A is an upper perspective view of one embodiment of a float portion of a float system in accordance with the invention.
Figure 9B:
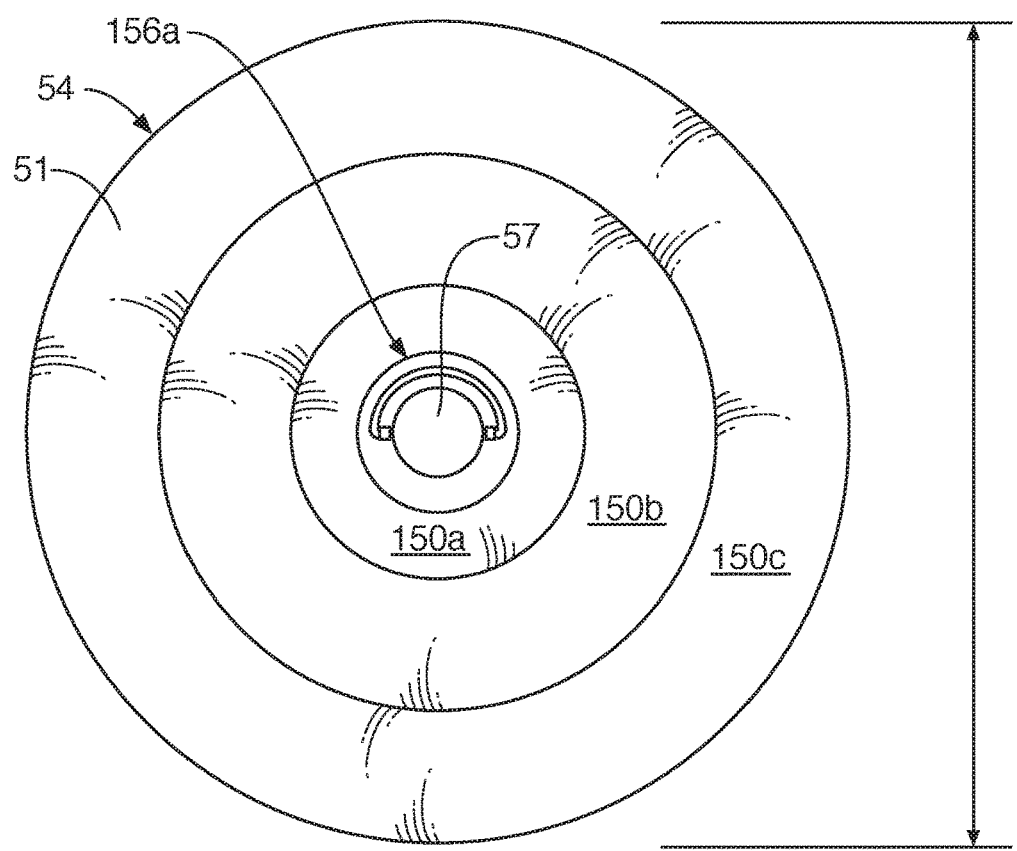
FIG. 9B is a top plan view thereof.
Figure 9C:
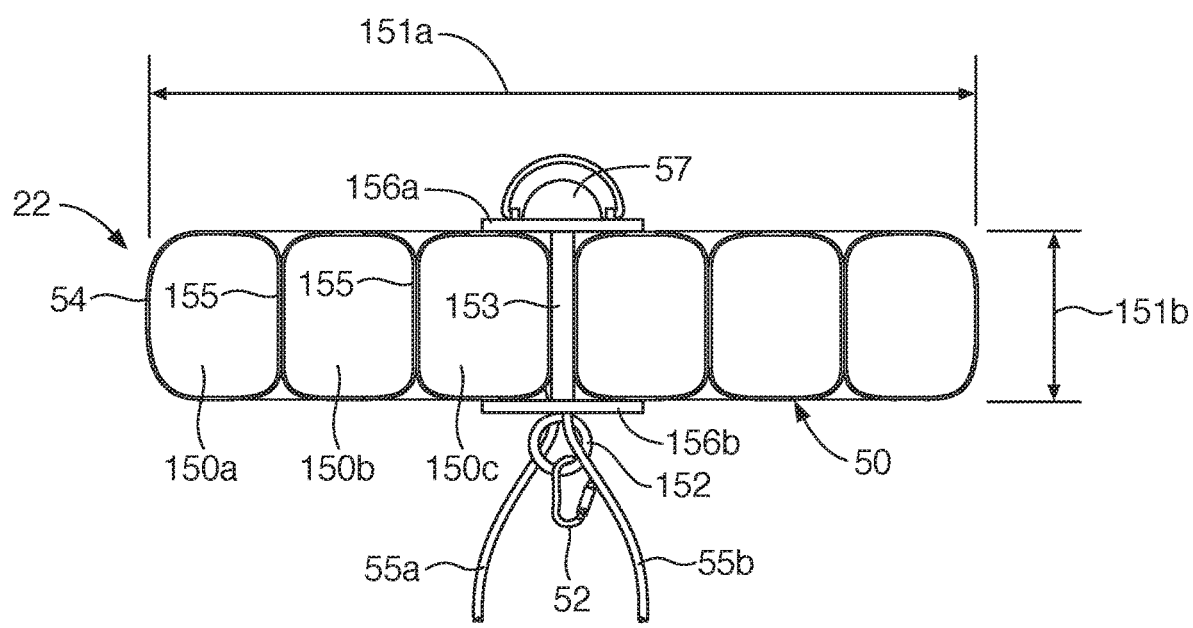
FIG. 9C is a cross-sectional, side elevation view thereof.

Referring to FIG. 8, the adapter 16 defines a second passage 100 (annulus 100) and second valve 84. The first valve 44 effectively defines a first leg 86*a* conducting and controlling flow exiting the tank 14 through the head 20 and connected line 18. In contrast, a second leg 86*b* of the adapter 16 connects to the tank 14 directly through the annular region 100 surrounding the inner conduit 40.

Meanwhile, each of the valves 44, 84 has an associated handle 88*a*, 88*b*, or actuator 88*a*, 88*b*, respectively, which may be electrical, mechanical, or manual. Herein, trailing reference letters on a reference numeral indicate specific instances of the item defined by the reference numeral, so either may be used.

Together, the combination of the legs 86 and valves 44, 84 with associated plumbing and controls constitute a fractionator 90 dividing out various constituents collected from the content of the tank 14. In other words, the fractionator 90 may connect by the flange 42 to a wall of a tank 14. Meanwhile, a flange 92 may act as a stop for the annular region 100, not affecting the inner passage 98 in the conduit 40. In an alternative embodiment, a flange 94 and housing 96 may actually provide the stop.

Connectors 102*a*, 102*b* may run effectively perpendicular or parallel to one another and correspond to the legs 86*a*, 86*b*.

A significant advantage of a fractionator 90 is that the oil lines or the line 18, corresponding conduit 40, adapter 40, and valve 48 need not ever be exposed to tank bottoms 34. Moreover, the valve 44 need not be exposed to tank bottoms 34. Also, the valves 44, 84 may remain connected at all times, while the cycles of filling, settling, draining, and the like continue. The liquid oil layer 30 and the liquid water layer 32 may refill, settle, and drain as often as desired, while the tank bottoms 34 may collect, quiesce, settle out, and otherwise accumulate at the floor of the tank 14.

Referring to FIGS. 5 through 8, one will note that a plate 50 or layer 50 may represent a bottom-most surface providing a "synthetic depth 53 by virtue of its diameter and therefore distance from the available gases (air, vapors, etc.), as well as its actual depth. In the illustrated embodiments, the bottom layer 50 may be matched by a top layer 51. In certain embodiments, a bottom layer 50 may be used without a top layer 51. In other embodiments, a top layer 51 may be used instead of a bottom layer 50. However, in those embodiments, it is best that the buoys 54, in this case a buoy 54, be sealed and seamed to the layers 50, 51. It should not pass air into the snorkel head 20 by any path that does not completely descend below the buoy 54, and to the center of the particular plate 50, 51.

An important consideration is the fact that one of the plates 50, 51 or layers 50, 51 will serve to define the synthetic depth 53. That synthetic depth 53 must provide a distance (including influences of depth and radius) effective to eliminate any air vortex in the surface 31 of the oil layer 30 and especially denying gases 36 any access to the head 20.

The buoy 54 may be serviced by two other lines 55*a*, 55*b*. The first, 55*a* runs from the buoy 54 down to and through the flange penetration 24 in the tank 14. This line 55*a* is a gas line 55*a* by which one may inflate a buoy 54 after it has been deployed inside the tank 14. If compacted, it needs to be inflated to burst bands 158 elevate up through the liquids added to the tank 14.

The second line 55*b* is a data line 55*b* that may be used to send, receive, or both, electrical or electronic signals. Signals may be used for controlling actuators associated with the buoy 54, data communicated with the sensor 57, or both. A sensor 57 may be of any suitable type, such as a proximity sensor 57, a magnetic sensor 57, a light sensor 57, an imaging sensor 57 such as a CID or CCD (charge injection device, charge coupled device, etc.), or some combination. One function of the sensor 57 is to provide a depth measurement, which may be inferred by detection of a top wall or surface of a tank 14.

In some contemplated embodiments, a sensor 57 may rely on ultrasonic signals to detect a distance from itself 57, near the upper surface 31, and the top 37 of the tank 14. To power sensors 57, a battery may be co-located with the sensor or in it. Such a battery may be rechargeable such as by a trickle charge through the electrical lines 55*b*. Power may also be delivered through the lines 55*b* from a remote location connected thereto through the socket 61*d*. Similarly, communication to and from the sensor 57 may be by radio frequency in any suitable format (frequency band, protocol, etc.), including blue tooth, cellular channels, and the like, but may best be served through hardware connection by way of the data lines 55*b* exclusively, since they are all accessible through the data jack 61*d* to any external source.

A fill fixture 59 may operate as a port 59 to inject air into the line 55*a* or relieve it. Of course, the objective is to pass air through the port 59, through the air line 55*a*, and ultimately into the buoy 54. Thus, the buoy 54 may be inflated at will after the entire buoy system 22 is installed inside the tank 14, along with the entire snorkel system 12.

In one presently contemplated embodiment of a gas fill fixture 59, a quick connect 61*a* commonly known in the hydraulic and pneumatic device industries is sealed upon connecting or disconnecting. A fixed tube 16 passes from a supply line connected thereto. It automatically closes in response to removal of a supply line. Meanwhile, the quick connect 61*a* automatically locks in a supply line and opens for flow into the fill fixture 59 upon connection of the supply line. The details are not necessary here as such devices are common, well known, and understood in the art.

The connector 61*a* may accordingly feed into a pipe 61*b* or tube 61*b* that is now inside the walls 61*c* of the adapter system 16. The tube 61*b* may thus connect to tubing 55*a* constituting the air line 55*a*. The actual tubing 55*a* may be flexible, and may pass up through the interior of the line 18 and the head 20 in order to reach and service the buoy 54. On the other hand, certain embodiments support a line 55*a* passing from the pipe 61*b* along the outside of the line 18 and pass the head 20 to service the buoy 54.

In the illustrated embodiment, a bail 62 on the head 20 may be rigidly affixed to extend from the head 20, or may be pivotable with respect thereto. The functionality thereof will depend on how the buoy 54 will be compacted in order to permit the buoy system 22 to pass through the drain port 15 ahead of the snorkel head 20, line 18, and adapter system 16. For example, it may be advisable to compact the buoy system 22 and particularly the buoy 54 to connect to, or even fit inside, the head 20 in order to fit through the port 15. On the other hand, so long as a suitable length 52 exists to connect the buoy system 22 to the bail 62 of the head 20, the entire buoy system 22 may be packed to have a diameter no greater than that required to fit the head 20, line 18, and adapter system 16 into the port 15 for securement and sealing thereto.

Monitoring pressure in the inflatable buoy system 22 may be done by connecting a stub 61*e* mating with the connector 59. Gases in the line 55*a* are in fluid communication throughout the line 55*a*, the connector 61*a*, stub 61*e*, and valve 61*f* (controlled by any suitable actuator 61*g*) to access a suitable meter 61*h*. The meter 61*h* may be manual, electronic, automatic, or of any suitable type. Thus, inflation may be monitored and maintained. Monitoring may be constant or periodic, and may be operably connected to a fill system capable of adding an inflation fluid into the line 55*a* and buoy 54.

Referring to FIGS. 5 through 8, one will note various embodiments for the fractionator 90 including a simplified drain 16 or adapter system 16. In one embodiment, the adapter system 16 simply provides a single line draining directly out of the tank 14, through the snorkel system 12. In an alternative embodiment, an annular approach may provide an inner fitting 40 forming an annulus 100 with an outer wall 61*c* of the fractionator 90. Accordingly, a valve 84 draining directly from the tank 14 through a passage 98 may feed through the annulus 100. Meanwhile, the contents of the tank 14 passing through the snorkel system 12 feed through the adapter 40 to pass out through the valve 44. Thus, the fractionator 90 feeds different materials taken from different levels within the tank 14 out through the two separate legs 102*a*, 102*b* controlled by the valves 44, 84.

One result of this configuration is that the wall 61*c* may be penetrated by the pipe 61*b* servicing the air line 55*a* or tubing 55*a* through the quick-connecting air fixture 61*a*. That is, the entire air fixture 59 may include a quick-connecting device 61*a*, feeding into a pipe 61*b* that traverses the wall 61*c* to pass through the annulus 100 where it may connect to tubing 55*a* operating as the air line 55*a*.

Referring to FIG. 8, in this configuration, the pipe 61*b* and tubing 55*a* may both extend outside the adapter 40, and therefore outside the line 18 and snorkel head 20. Therefore, in this configuration the air line 55*a* may simply be passed along the outside of the line 18 (drain line 18) to eventually arrive near the head 20, secured periodically to and along the line 18 for convenience. By the same token, one may see that a data connection 61*d* may be made analogously as the air fixture 59. For example, in one embodiment, a fixture 61*d* may be a data fixture 61*d* feeding a data line 55*b*. Accordingly, a data line 55*b* may pass therethrough or therefrom through the interior of the line 18 and head 20, or outside thereof.

One may also note, between the flange 94 and the valve 44, fixtures 59, 61*d* for passing air through a gas line 55*a* or data thru a data line 55*b*, respectively. Each may be secured between the flange 94 and valve 44 in order to pass through the penetration 15 to pass the interior of the line 18 and the head 20, or external thereto. Thus, either option is available, depending on whether a fractionator 90 or a simple adapter 16 penetrates the port 15 of the tank 14.

Referring to FIGS. 9A through 9E, one may note that a buoy 54 may be constructed in a variety of ways. For example, a buoy 54 may be constructed to include multiple chambers 150. In the illustrated embodiment, the chambers 150 are effectively concentric tubes 150. Near the center of the buoy 54, and sealed sufficiently to prevent air passage, a securement 152 or connector link 152 may connect by a shaft 153 or tether 153 to the buoy 54. One may see that a diameter 151*a* and a thickness 152*b* of the buoy 54 may be selected to stiffen or otherwise optimize the mechanical characteristics of the buoy 54.

For example, a single chamber 150 may tend to balloon according to the principles of pressure vessels and pneumatics. Without shared walls 155 between chambers 150, no restraint on the relationship between diameter 151*a* and thickness 151*b* would constrain the shape thereof. On the other hand, by providing multiple shared walls 155 bonded or securing the chambers 150 together along a specified distance, the shape and thickness 151*b* may be specifically controlled.

Thus, the contribution of each chamber 150 to the overall diameter 151*a* will be dictated by the thickness 151*b* resulting from the appropriate length of the shared walls 155 of the chambers 150. One may see that a comparatively greater number of chambers 150 with shared walls 155 may provide a comparatively stiffer buoy 54 and diameter 151*a*. Such stability aids securement 153 and may connect a top plate 51 (top layer 156*a* or top surface 156*a*) and a bottom one 156*b*, 50. A flexible web 153 or hollow shaft 153 extending therebetween may provide their own unique advantages, such as ability to compact and ability to support axial compression, respectively.

Meanwhile, the air tube 55*a* may connect to fill up the chambers 150. These chambers 150 will typically be in fluid communication with one another, even though their shared walls 155 provide for mechanical (structural) separation and structural stability thereof. Likewise, the data line 55*b* may pass up through the shaft 153 or webbing tether 153, which may be tubular in order to accommodate the data line 55*b*. Regardless, a proximity sensor 57 or other sensors 57 may maintain data communication with sensors 57 through the data line 55*b* and a suitable fixture 59 exiting the adapter 16 or fractionator 90 outside the tank 14.

Referring more particularly to FIGS. 9D and 9E, a compacted buoy system 22 may be secured by burstable bands 158 or straps 158. In FIG. 9D, a bottom anchor 152 or link 152 secures to the bottom plate 156*b*. It may otherwise connect to a compacted buoy system 22 and to a bail 162 secured to the head 20. In this embodiment, the links 152 may include at least one selectively openable link 152 to secure the compacted buoy system 22 to the bail 162. In such an embodiment, the compacted buoy system 22 may be passed through the port 15 in the tank 14 (trailer 14) ahead of the head 20 itself, which is followed by drain line 18.

Referring to FIG. 9E, in this embodiment, the compacted buoy system 22 may be secured within the channel 64 of the head 20. This may require that the bail 62 be pivotably connected to the head 20. It may then be tipped aside or pivoted aside to provide clear access to the channel 64 by the compacted buoy system 22 to be fitted into the channel 64.

Referring to FIGS. 10A through 10D, in certain embodiments, the chamber 150 may be reduced to a single toroidal chamber looking something like an inner tube for a tire. In this embodiment, a top layer 50, or a bottom layer 51 may be secured and sealed or otherwise stretched along the interior of the toroid 150 that constitutes the chamber 150. Accordingly, it may be necessary to mechanically stiffen the buoy system 22 once inflated inside the tank 14.

To this end, struts 160 or braces 160 may pivotably (downward) connect to a top plate 156*a*, also pivotably securing to ears 162 formed in either the top surface 51 or the toroidal chambers 150, depending on exactly where the seal therebetween is located. In this embodiment, one may see that the struts 160 may be folded down (pivoting about the top plate 156*a* to enclose the buoy 54).

A square corner fitted against the top plate 156*a* blocks upward pivoting. Bands 158 may secure the buoy system 22 together for securement to the bail 62 supporting the head 20 on the line 18.

Figure 10A:
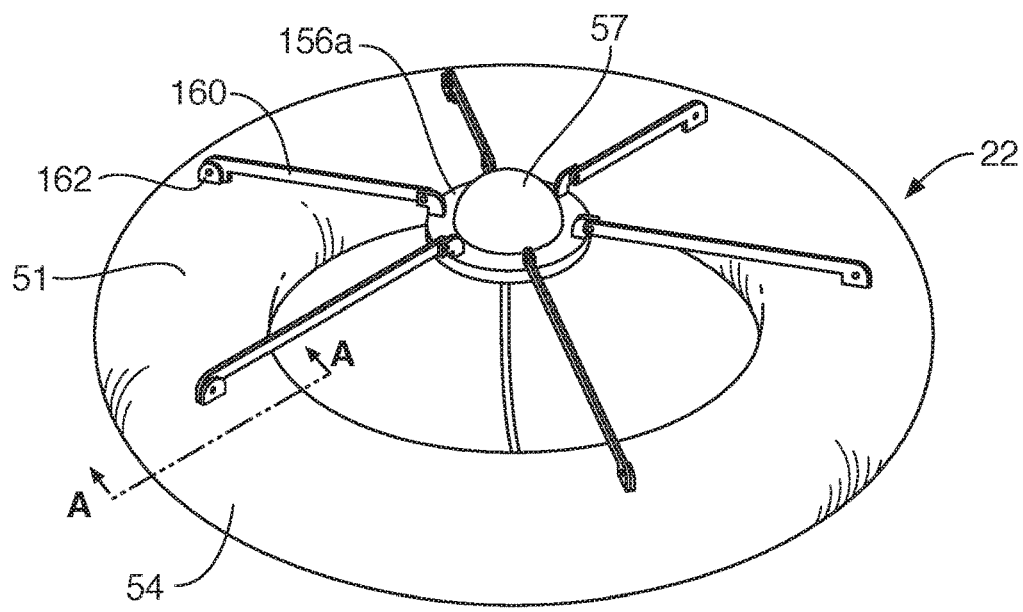
FIG. 10A is an upper perspective view of an alternative embodiment for a float system (buoy system) for a snorkel in accordance with the invention.
Figure 10B:
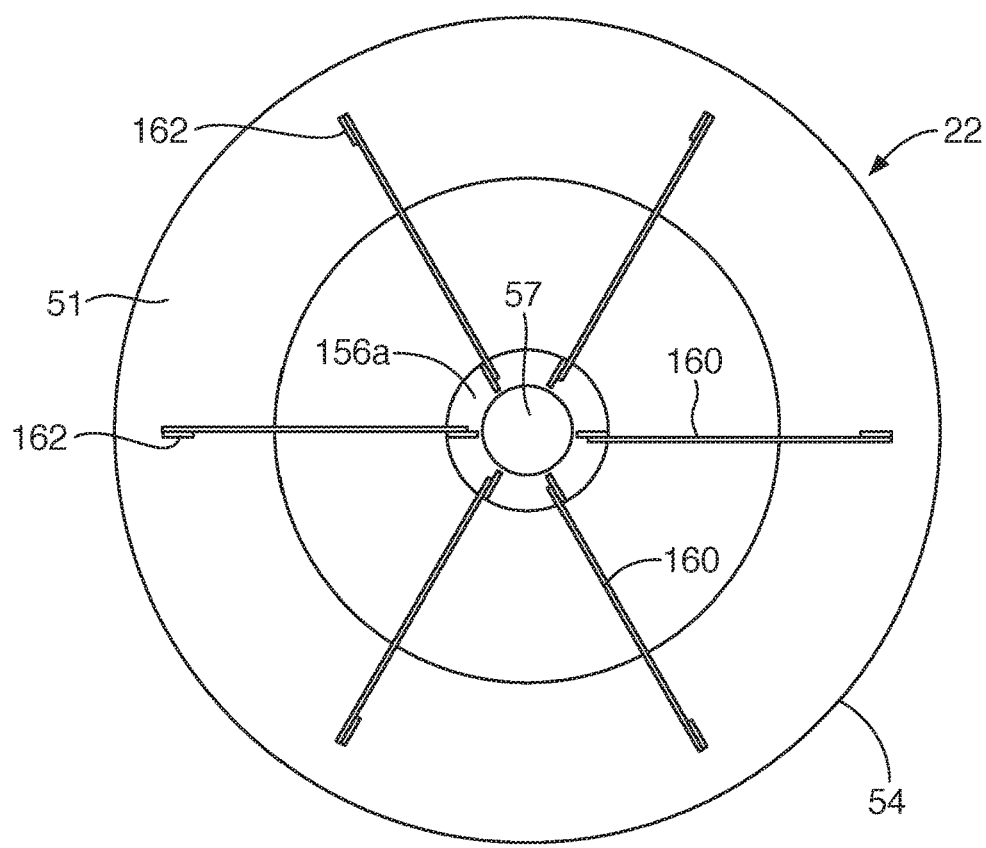
FIG. 10B is a top plan view thereof.
Figure 10C:
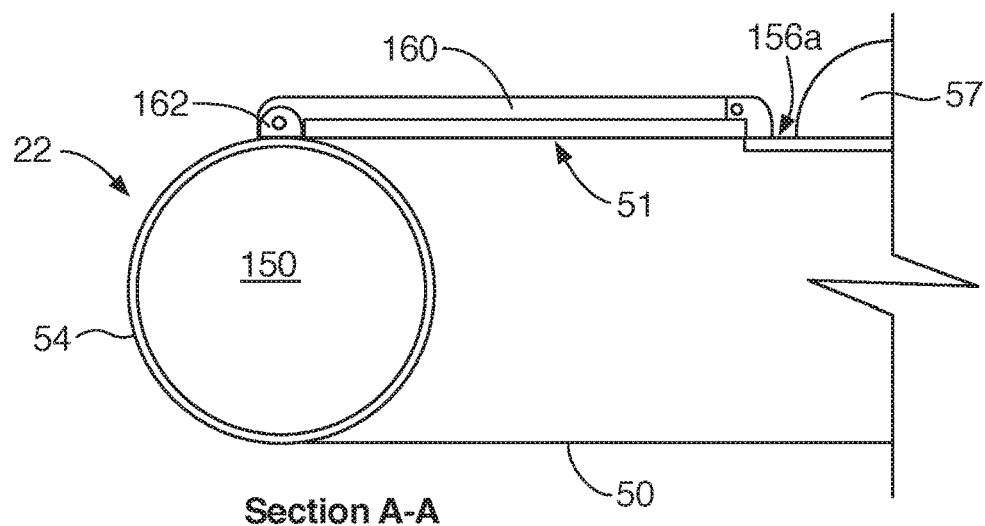
FIG. 10C is a cross-sectional, side elevation view of a portion thereof illustrating struts and the toroidal buoy.

For example, in FIG. 10*a*, the perspective view illustrates a top plate 156*a* from which struts 160 are hinged to pivot downward, but to fix horizontally when lifted upward several struts 160 or braces 160. By having a central end for each strut 160 that is square on top and radiused on the bottom, each of the struts 160 may be folded down about a pivoting connection with the top plate 156a. When buoyant forces lift or provide lift forces on the toroidal buoy 54, the braces 160 or struts 160 are limited in their movement by the engagement of the upper squared corner against the top plate 156a to which it is pinned.

At an opposite or outer end (in a radial direction) each of the struts 160 also includes a pivoting connection to an ear 162. In an inflated configuration, the buoy 54 tends to stretch to its maximum diameter and radius. In contrast, when deflated, the buoy 54 constitutes a substantial expanse of flexible material making up the empty chamber 150 as well as any top layer 156a (51) or bottom layer 156b (50) that may serve as the "plate" 50 operating to limit access to the snorkel head 20 by overlying gases 36.

Figure 10D:
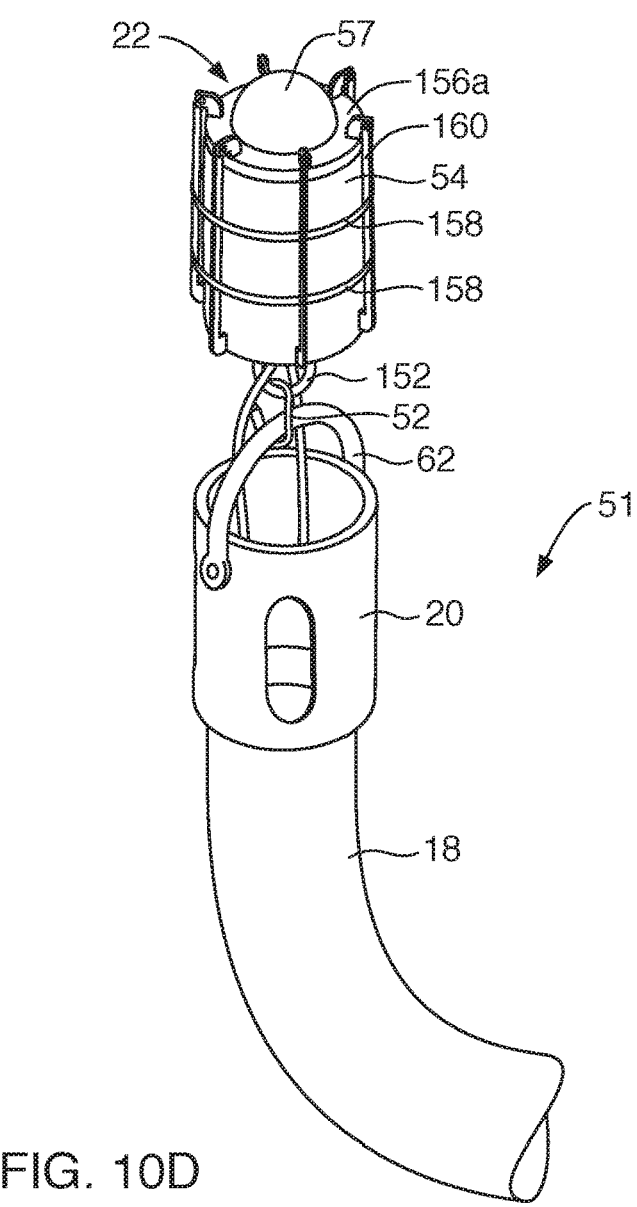
FIG. 10D is a perspective view thereof in a compacted configuration ready to be installed through a drain port of a tank, in accordance with the invention.

In a stowed or compacted configuration of FIG. 10D, one will see that the flexible portions of the buoy 54 may be folded up inside, outside, or some combination with respect to the bundled struts 160 folded down from the top plate 156a. In certain embodiments, all or part of such a compacted buoy system 22 may be beneficially installed or ensconced within the head 20 of a snorkel system 12 for passage through the port 15 into the tank 14. On the other hand, the principal need is simply for a compacted buoy system 22 capable of fitting through the drain port 15 to which the overall snorkel system 12 is to be adapted. Thus, so long as a compacted buoy system 22 is linked to a bail 62 of the head 20, the compacted buoy system 22 may be passed through the port 15 separately (though linked) in front of the head 20, which follows the buoy system 22, and is subsequently followed by the drain line 18 and the adapter 16 in due course.

Maintenance access is always available once a tank 14 has been drained empty. Inflation of the chamber 150 of the buoy 54 may be done remotely as described hereinabove. The bands 158 need not be particularly strong, and may even be formed of a thin plastic such as polyethylene or even kraft paper or the like. Accordingly, an increase in pressure within the chamber 150 will apply a substantial force. Pressure times area, when area is large, constitutes a substantial force. Pressure will expand the braces 160 away from one another and burst the bands 158 securing the buoy system 22 in a compacted configuration.

Referring to FIGS. 11A through 11D, in this embodiment, the shaft 153 connecting the top plate 156a to the bottom plate 156b may secure a buoy 54 together. Connecting walls 155 may exist in order to maintain a shape. However, one objective of such a configuration is to minimize the amount of material passing between the top layer 51 and the bottom layer 50. Accordingly, any shared walls 155 may be minimized.

The illustrated embodiment includes a buoy 54 constituted by lower 50 and upper 51 layers. These may be connected by intermediate walls 155, here constituted by a "honeycomb" network 155 of hexagonal regions. Fabrication of such geometries is available in such materials as kraft paper, fabrics, and the like. In fact, such configurations are possible with foils of metals. In the illustrated embodiment, an objective is compactability. Accordingly, in a deployed configuration of FIG. 11A, the honeycomb walls 155 in the chamber 150 are secured to the lower 50 and upper 51 layers. In this way, those layers 50, 51 may be virtually flat due to the frequent (approximating constant) connection between the walls 155 and the layers 50, 51.

Figure 11A:
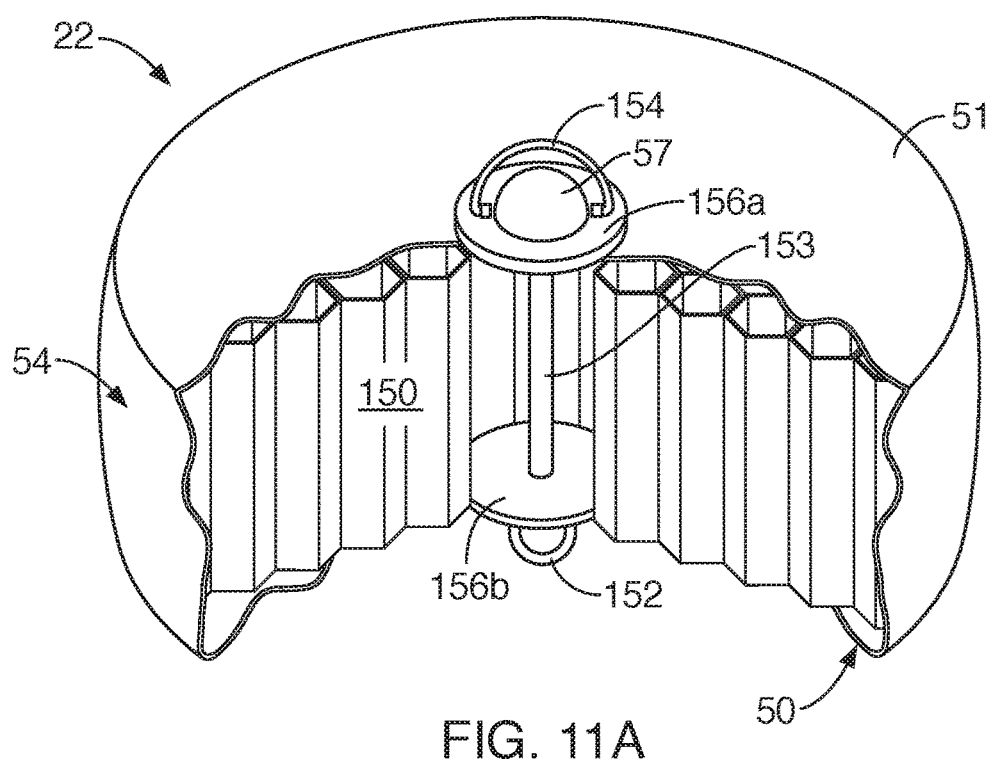
FIG. 11A is an upper perspective view of an alternative embodiment of a buoy system (float system) in accordance with the invention.
Figure 11B:
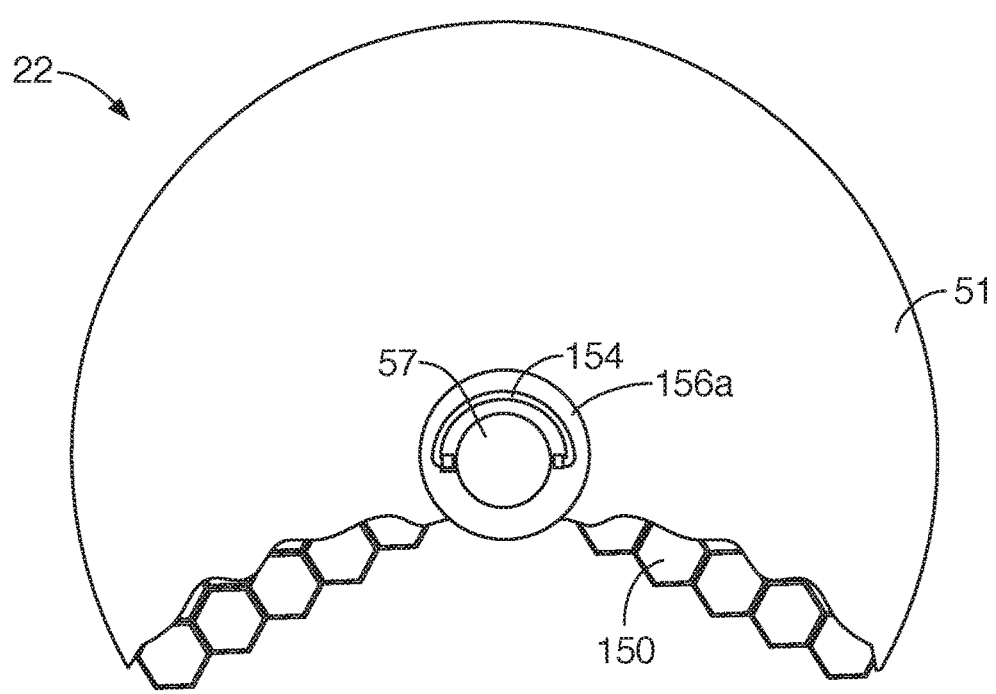
FIG. 11B is a top plan view thereof.
Figure 11C:
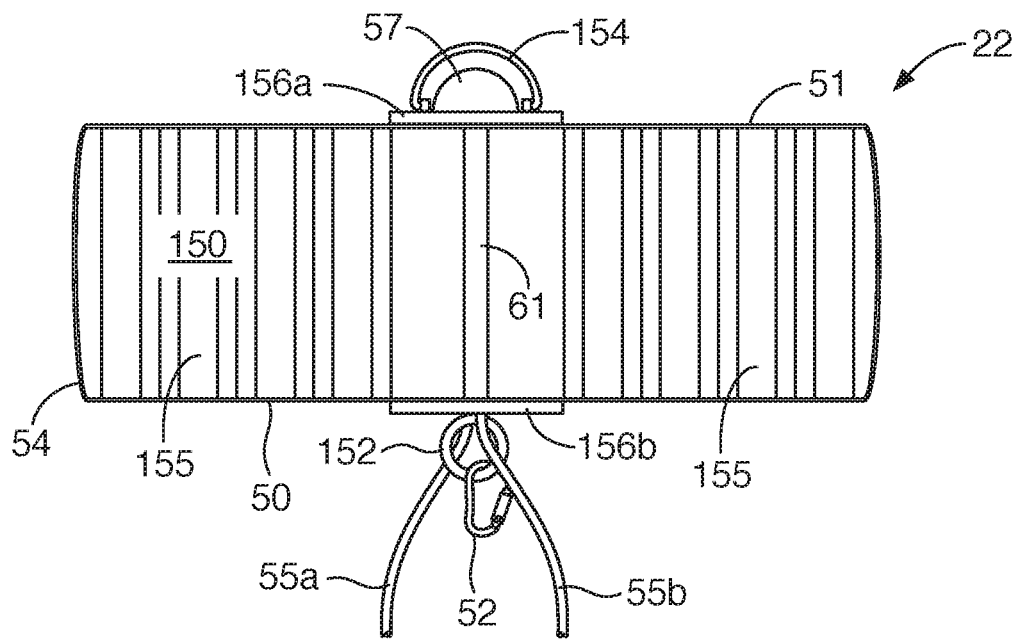
FIG. 11C is a cross-sectional, side elevation view thereof.
Figure 11D:
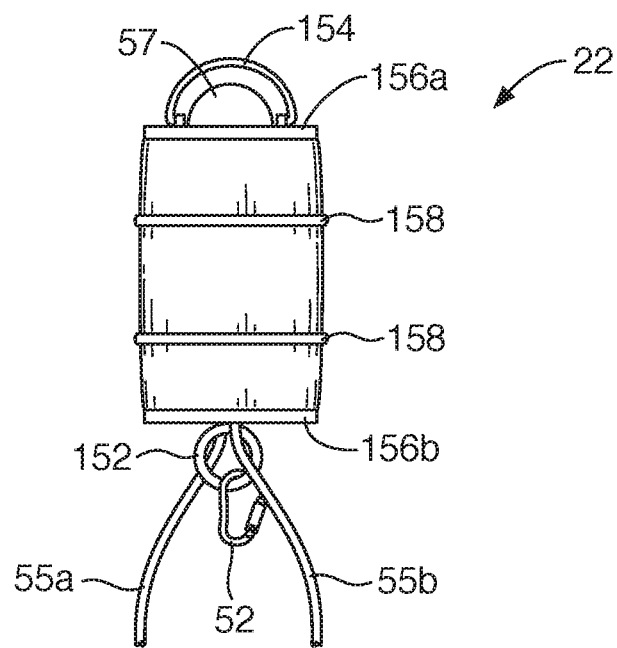
FIG. 11D is a side elevation view thereof in a compacted configuration suitable for insertion into a snorkel head or securement to a snorkel head ready for insertion into a drain port of a tank, in accordance with the invention.

As seen in the top plan view 11B and side, elevation, cross-section view 11C, one can see that very little requirement exists for any particularly fixed spaces or volumes in a compacted configuration. For example, the shaft 153 may simply be a tether 153. Accordingly, nearly the entirety of the buoy 54 may be compacted in any of several shapes. For example, the diameter may simply be decreased by folding all of the walls 155 against one another, resulting in a very compact configuration about the central shaft 153 or tether 153. In such a configuration, as illustrated in FIG. 11D, bands 158 may simply secure the compacted buoy 54 leaving connectors 152, 154 exposed for connecting to the bail 62 and any lifting mechanism that may be desired.

The shaft 153 may be flexible and the entire buoy system 22 may be compacted. For example, a compacted buoy system 22 of FIG. 11D may be of a size to connect to the bail 62 outside a channel 64 or inside a channel 64 of a head 20.

In this particular configuration, all of the buoy system 22 may be formed of flexible materials so long as they are not degraded by constituents within the tank 14.

Figure 12:
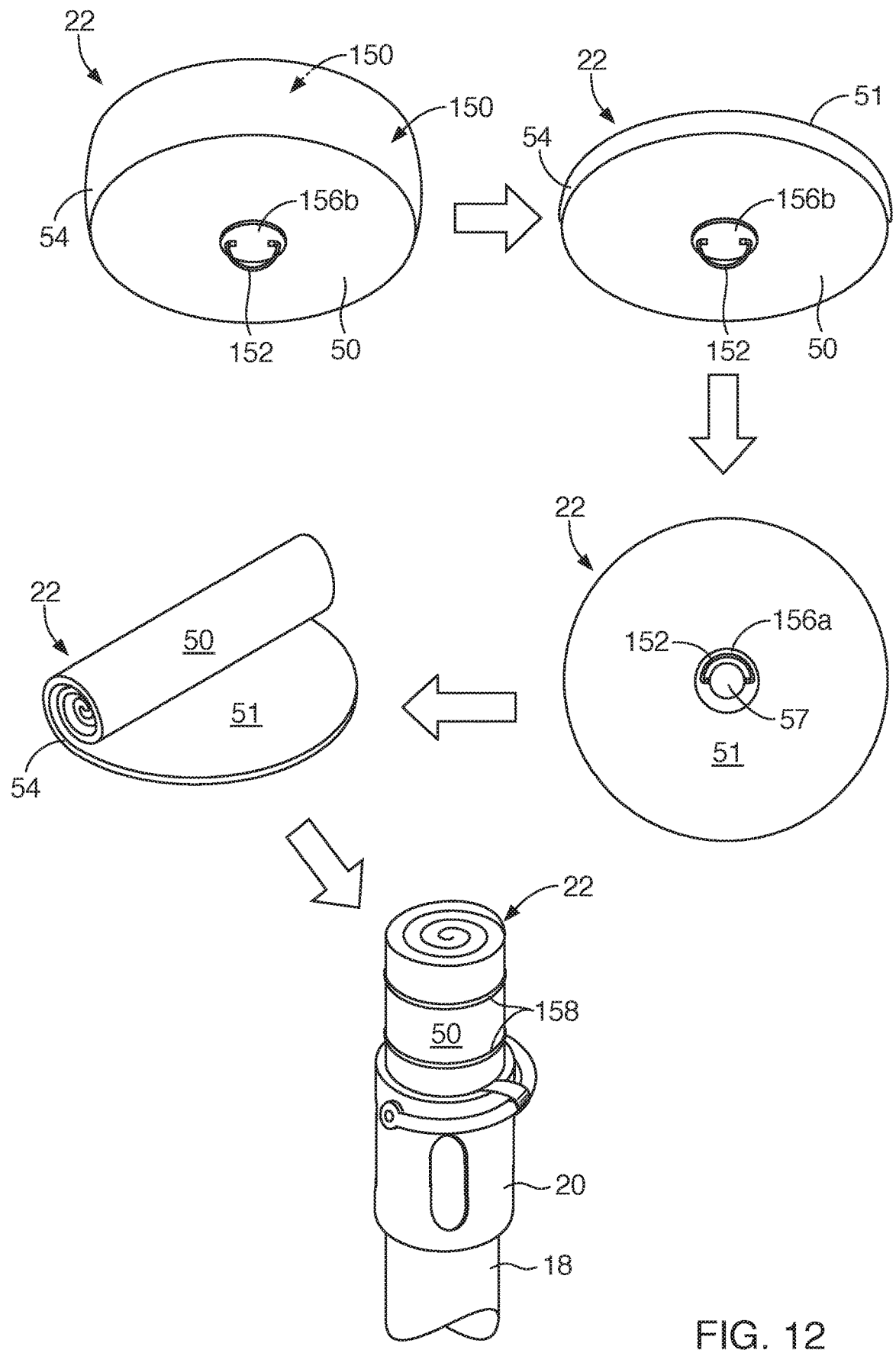
FIG. 12 is a view of a process of steps (FIGS. 12A through 12E) for compacting an inflatable buoy system in accordance with certain embodiments thereof, including images of a fully inflated buoy system, deflated configuration thereof, a top view in the deflated configuration, a rolling up process of the flattened buoy system, and the compacted buoy system inserted into a snorkel head in preparation for insertion into a drain port of a tank, respectively, in accordance with the invention.

Referring to FIG. 12, while continuing to refer to FIGS. 11A through 11D, a process is illustrated for folding up a configuration of FIGS. 11A through 11D. For example, the links 152 may fold up such that the chambers 150 will collapse the top surface 51 against the bottom surface 50. If the link 153 or shaft 153 is simply a tension member, it may simply be made of webbing or the like. It may be easily folded up and merely needs to support tension between the upper surface 51 and the bottom surface 50. In the illustrated embodiment, releasing air from the chambers 150 results in the bottom surface 50 and upper surface 51 collapsing together. At this point, the flat system 22 may be rolled up and banded 158 in order to fit within (or ahead of) the head 20 or the channel 64 of the head 20.

In the illustrated embodiment, the perspective view of FIG. 12A illustrates a fully inflated deployable configuration of the buoy system 22. One way to compact such a system 22 is to simply flatten the lower 50 and upper 51 surfaces toward one another. This may be more suitable for systems 22 that include flexible material tethering the two surfaces 50, 51 together. For example, a comparatively sparse or large diameter honeycomb configuration might be susceptible to compacting as illustrated in FIG. 12B. Similarly, configurations that constitute concentric inflation chambers 150 may similarly fold up with comparative convenience.

Most particularly, to the extent that any central shaft 153 is instead constituted as a web 153 or tether 153 of great flexibility, comparatively negligible resistance need be encountered in compacting the buoy 54. Thus, having a now thinned height, the buoy system 22 of FIG. 12C may be rolled as illustrated in FIG. 12D. In certain embodiments, the buoy system 22 may be folded over once or more before rolling perpendicular to a fold line therein. Thus, a diameter may be traded off against a length in the compacted buoy system 22 illustrated in FIG. 12E.

Again, whether the compacted buoy system 22 is fitted within the head 20 or is simply linked to the head 20 and passed through the port 15 before the head 20 is not critical. Thus, certain freedom to compact the buoy system 22 into a larger diameter of packaging is available. Accordingly, the particular shape, diameter, and length of any compacted buoy system 22 need only be dictated by the size of the port 15 and the convenience of installation therethrough.

Figure 13:
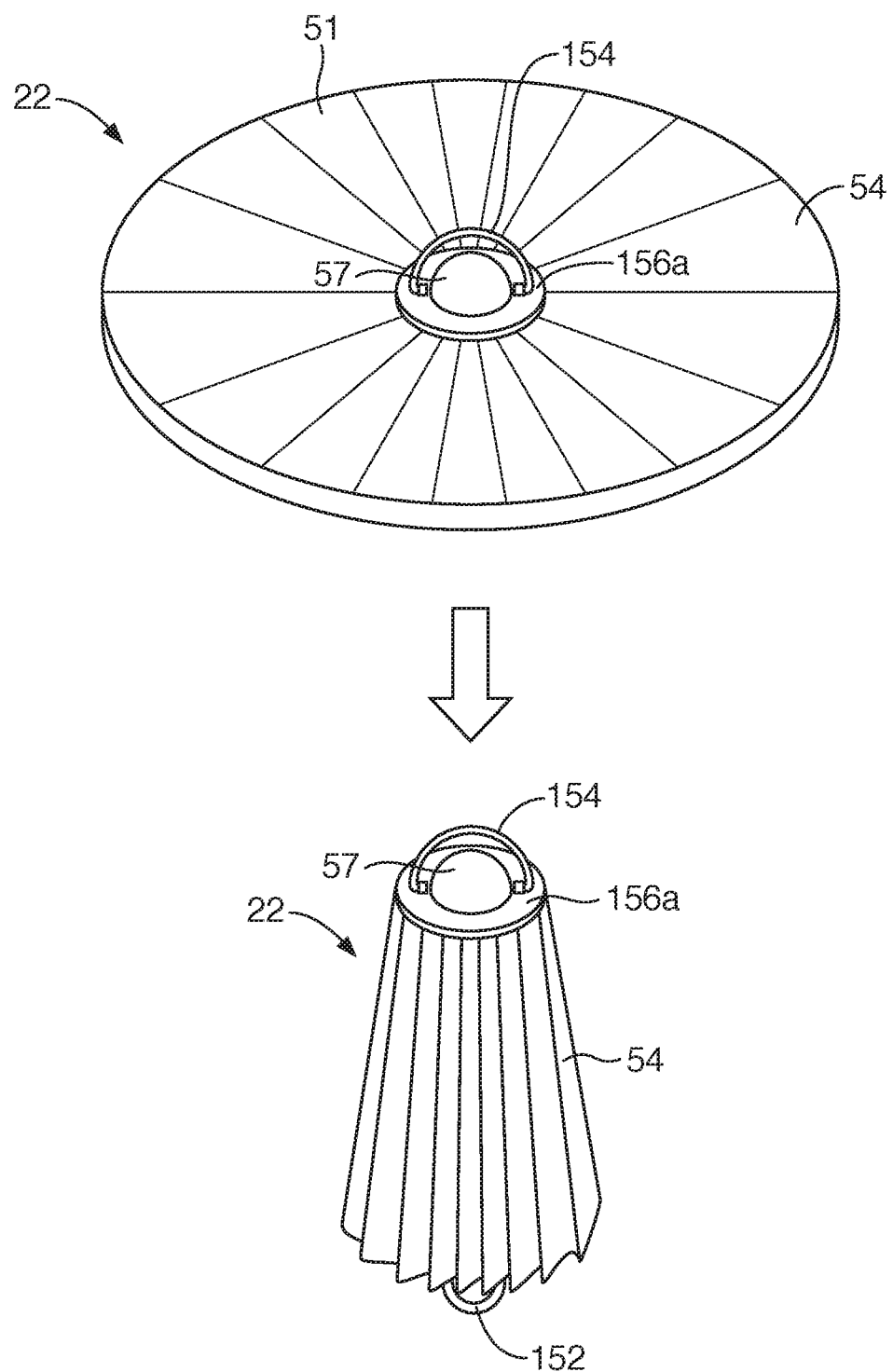
FIG. 13 is an image of an alternative compacting process of steps (FIGS. 13A through 13B) for compacting a buoy system in one alternative embodiment to a flattened and flexible shape, after which it may be folded up in an interleaved configuration, much as an umbrella, in order to insert into a snorkel head or otherwise compact and secure thereto. It is inflated after installation through a drain port of a tank, in accordance with the invention.

Referring to FIG. 13, in an alternative embodiment, rather than rolling up a buoy system 22. A buoy system 22 may be collapsed flat on itself, and then folded up like an umbrella. Links 152 may be connected for suspending the head 20 by its bail 62.

In various embodiments, an additional mechanism or configuration for compaction may take that hint from umbrellas. If the securements 152, 154 and the top plate 156*a* and bottom plate 156*b* are either sufficiently flexible or sufficiently small, they may be positioned together as in FIG. 13A. The layers 51, 52 may be compacted toward one another. These top 156*a* (51) and bottom 156*b* (50) plates may be placed in close proximity. The remainder of the buoy 54 is basically flexibly draping downward therefrom.

Accordingly, a few appropriate folds in the flexible material of the buoy 54 may be lapped over one another much as an umbrella would close. Of course, not being made of anything so thin as umbrella material, nor so flexible, the inflatable buoy 54 will have a larger resulting envelope (outer shape dictated by maximum dimensions). That envelope will necessarily conform to the amount of material and its stiffness making up the buoy 54. Nevertheless, a typical buoy 54, and particularly the plates 50, 51 or layers 50, 51, typically only require a diameter of about two feet or less. Thus, any of the foregoing configurations may be suitable for packaging a flexible material constituting a buoy 54 suitable for banding 158 in preparation for installation in a tank 14.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus operable as a liquid-liquid separator comprising:
   a tank defining a bottom, a wall, and a volume therewithin capable of containing a liquid mixture comprising a first liquid, comparatively lighter and tending to rise toward an upper surface bounding a mixture of gases, comprising air and vapors, thereabove and a second liquid, comparatively heavier and tending to descend toward the bottom;
   a port penetrating the wall proximate the bottom and sized to fit a drain valve; and
   a buoy system capable of compacting to fit through the port and deploying to lift a snorkel comprising a head end, provided with an opening as an inlet, an exit at a bottom end connected to the drain valve, and conduit extending between the inlet and the exit to drain the first liquid into the inlet proximate the upper surface, through the conduit to the exit, and out through the port.

2. The apparatus of claim 1, wherein the buoy system comprises a chamber, capable of inflating to increase buoyancy thereof sufficiently to lift the snorkel to a position capable of draining the first liquid from proximate the upper surface.

3. The apparatus of claim 2, wherein the buoy system comprises a surface sized and positioned to be capable of resisting formation of vortices in the upper surface.

4. The apparatus of claim 3, wherein the buoy system comprises a fill line operably connected to deploy the buoy system by inflating the chamber.

5. The apparatus of claim 4, wherein the buoy system comprises a sensor supported thereby and capable of collecting information effective to determine a position of the upper surface.

6. The apparatus of claim 2, wherein the snorkel comprises a snorkel head connected to suspend from the buoy system a distance selected to drain from proximate the upper surface only the first liquid, free of vortices.

7. The apparatus of claim 2, wherein the position is selected to resist formation of a vortex, effecting at least one of entraining the gas mixture and entraining the second liquid proximate the uppermost surface.

8. The apparatus of claim 1, wherein the buoy system comprises an obstruction, held in position between the upper surface and the snorkel, capable of increasing a travel distance required of a material to move from proximate the upper surface to the snorkel.

9. The apparatus of claim 8, wherein:
   at least one of a depth of the snorkel head and the travel distance is selected to resist the vortex by increasing effective hydrodynamic drag in the first liquid; and
   the obstruction is configured as a flow field controller operably connected to the buoy to restrict access to the snorkel head to a region radially outside the flow field controller.

10. A method of deploying a snorkel head in a settling tank, the method comprising:
    selecting an apparatus operable as a liquid-liquid separator comprising a tank having a bottom and a wall therearound, penetrated proximate the bottom by a port, the tank being capable of containing a liquid mixture comprising a first liquid, comparatively lighter and tending to rise toward an upper surface bounding a gas mixture thereabove, and a second liquid, comparatively heavier and tending to descend toward the bottom;
    providing a snorkel system comprising a buoyancy system compactible to fit through the port and expandable to float at the upper surface, a snorkel head capable of being supported in operation by the buoyancy system, and a line capable of flexibly connecting in fluid communication the snorkel head and the port;
    installing through the port the snorkel system operable therewithin while the tank is in a substantially empty condition, and
    deploying the buoyancy system by inflating floatable portions thereof to be capable of continually following the upper surface by floating thereon upon introduction of the mixture into the tank.

11. The method of claim 10, comprising fitting to the port a drain valve capable of selectively closing and draining the tank from the upper surface through the snorkel system.

12. The method of claim 11, wherein installing comprises passing the snorkel system through the port with the buoyancy system secured to the snorkel head in a compacted configuration.

13. The method of claim 10, comprising:
    closing the tank and port to contain the mixture by securing the snorkel system thereto;
    adding to the tank the mixture, defining the upper surface thereof;
    lifting the snorkel head by the buoyancy system following the upper surface;
    deploying a surface of the snorkel system capable of obstructing creation of vortices in the upper surface; and following, by the snorkel head, the upper surface while draining the first liquid from proximate the upper surface through the snorkel head, line, and port.

14. The method of claim 10, wherein the buoy system comprises a chamber, capable of inflating to increase buoyancy thereof sufficiently to lift the snorkel head to a position capable of draining the first liquid from proximate the upper surface.

15. The method of claim 10, wherein the buoy system comprises a surface sized and positioned to be capable of resisting formation of vortices proximate the upper surface by controlling a flow field surrounding the surface.

16. The method of claim 15, wherein the buoy system comprises a fill line operably connected to deploy the buoy system by inflating the chamber.

17. The method of claim 10, wherein:
the buoy system comprises a sensor supported thereby and capable of collecting information effective to determine a position of the upper surface;
the snorkel head is connected to suspend from the buoy system a distance selected to drain from proximate the upper surface only the first liquid, free of vortices capable of entraining undesired fluids into the snorkel head;
the buoy system comprises an obstruction, held in position between the upper surface and the snorkel, capable of increasing a travel distance required of the gas to move from the upper surface to the snorkel; and
at least one of a depth of the snorkel head and a travel distance from the upper surface thereto is selected to resist formation of vortices by increasing hydrodynamic drag; and
the obstruction is sized and shaped to act as a flow field controller operably connected to restrict access, by the gas, to the snorkel head from a region outside the flow field controller.

18. A method of deploying a snorkel drain in a settling tank, the method comprising:
selecting an apparatus operable as a liquid-liquid separator comprising a tank having a bottom and a wall therearound, penetrated by a port proximate the bottom, the tank being capable of containing a mixture comprising a first liquid, comparatively lighter and tending to rise toward an upper surface, and a second liquid, comparatively heavier and tending to descend away from the upper surface;
providing a snorkel system comprising a buoyancy system compactible to fit through the port, a snorkel head capable of being supported in operation by the buoyancy system, and a line capable of flexibly connecting in fluid communication the snorkel head and the port, tethering the snorkel head to be capable of tracking the upper surface independently from changes in a height thereof;
opening the port while the tank is in a drained condition;
passing the snorkel system through the port;
closing the tank and port by securing the snorkel system thereto;
deploying the buoyancy system by inflating airtight portions of the buoyancy system to be capable of floating upon the liquid mixture to the upper surface thereof upon introduction thereof into the tank.

19. The method of claim 18, comprising:
adding to the tank the liquid mixture, defining the upper surface thereof;
following the upper surface by the buoyancy system in an inflated condition;
separating out, by the tank, constituents of the mixture by remaining undisturbed for a time selected to be so effective; and
draining the first liquid from proximate the upper surface through the snorkel head, line, and port.

* * * * *